(12) United States Patent
Furukoshi

(10) Patent No.: US 9,222,516 B2
(45) Date of Patent: Dec. 29, 2015

(54) ROLLING BEARING, THROTTLE VALVE APPARATUS, AND ANTI-LOCK BRAKE SYSTEM

(71) Applicant: MINEBEA CO., LTD., Kitasaku-gun, Nagano (JP)

(72) Inventor: Akimi Furukoshi, Kitasaku-gun (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 0 days.

(21) Appl. No.: 14/106,083

(22) Filed: Dec. 13, 2013

(65) Prior Publication Data
US 2014/0185975 A1 Jul. 3, 2014

(30) Foreign Application Priority Data
Dec. 27, 2012 (JP) ................... 2012-285196

(51) Int. Cl.
*F16C 33/78* (2006.01)
*F16C 19/06* (2006.01)
*F16J 15/32* (2006.01)

(52) U.S. Cl.
CPC ......... *F16C 33/7823* (2013.01); *F16C 33/7853* (2013.01); *F16J 15/3232* (2013.01); *F16C 19/06* (2013.01); *F16C 33/7826* (2013.01)

(58) Field of Classification Search
CPC ............. F16C 33/7853; F16C 33/7826; F16C 33/7823; F16C 33/7816; F16C 33/782; F16J 15/32; F16J 15/3204; F16J 15/322; F16J 15/3232; F16J 15/3276
USPC ........................................................ 384/486
See application file for complete search history.

(56) References Cited

U.S. PATENT DOCUMENTS

| | | | | |
|---|---|---|---|---|
| 3,203,740 | A * | 8/1965 | Peickii et al. ................. | 384/486 |
| 3,689,081 | A * | 9/1972 | Kinberg et al. ............... | 277/309 |
| 3,854,734 | A * | 12/1974 | West .............................. | 277/565 |
| 3,955,859 | A * | 5/1976 | Stella et al. ................... | 384/215 |
| 4,326,723 | A * | 4/1982 | Arai ............................... | 277/573 |
| 4,526,485 | A * | 7/1985 | Frase et al. .................... | 384/486 |
| 4,765,761 | A * | 8/1988 | Umezaki ....................... | 384/484 |
| 5,385,352 | A * | 1/1995 | Kurose .......................... | 277/551 |
| 6,843,410 | B2 * | 1/2005 | Terazawa ...................... | 235/103 |
| 7,066,467 | B2 * | 6/2006 | Sakata .......................... | 277/351 |
| 2001/0045335 | A1 * | 11/2001 | Takeda et al. .................. | 192/98 |
| 2003/0156772 | A1 * | 8/2003 | Yamashita et al. ............ | 384/486 |
| 2004/0037480 | A1 * | 2/2004 | Lee et al. ...................... | 384/486 |

(Continued)

FOREIGN PATENT DOCUMENTS

JP A-2004-263734 9/2004

*Primary Examiner* — Alan B Waits
(74) *Attorney, Agent, or Firm* — Oliff PLC

(57) ABSTRACT

The sealing performance against positive and negative pressures is increased and sufficient air tightness against pressure fluctuations is maintained in a rolling bearing having a sealing function. Seal members are provided on both ends of a bearing. The seal members include a metal core and an elastic body, and are fixed to an outer ring. Outside and inside lip parts of the seal members contact an outer peripheral surface of an inner ring. When a positive pressure acts on the outside of the seal member, the outside lip part is pressed to the outer peripheral surface of the inner ring, and the air tightness is maintained. When a negative pressure acts, the inside lip part is pressed to the outer peripheral surface of the inner ring by the differential pressure between the outside and inside of the rolling bearing, and the air tightness is also maintained.

9 Claims, 7 Drawing Sheets

(56) References Cited

U.S. PATENT DOCUMENTS

| | | | |
|---|---|---|---|
| 2004/0264824 A1* | 12/2004 | Iwata | 384/484 |
| 2007/0242913 A1* | 10/2007 | Kawaguchi | 384/504 |
| 2008/0205808 A1* | 8/2008 | Takimoto et al. | 384/480 |
| 2011/0160384 A1* | 6/2011 | Shimazu et al. | 524/539 |
| 2012/0051680 A1* | 3/2012 | Ishikawa et al. | 384/462 |
| 2012/0114278 A1* | 5/2012 | Winkelmann | 384/466 |
| 2012/0223266 A1* | 9/2012 | Furukoshi | 251/305 |
| 2012/0301065 A1* | 11/2012 | Mori et al. | 384/469 |
| 2013/0308886 A1* | 11/2013 | Okaji et al. | 384/485 |

* cited by examiner

F I G. 2
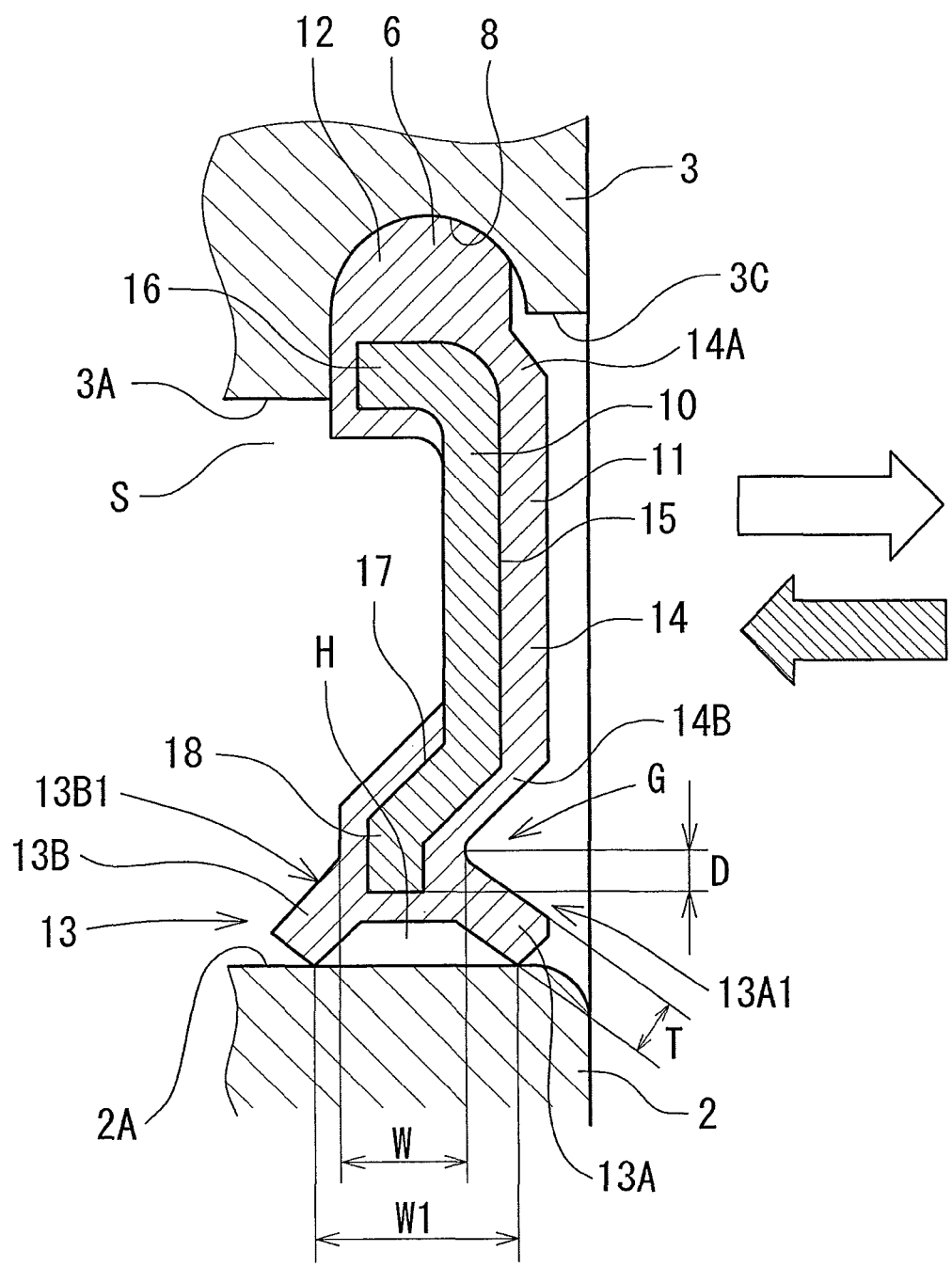

ROLLING BEARING, THROTTLE VALVE APPARATUS, AND ANTI-LOCK BRAKE SYSTEM

BACKGROUND OF THE INVENTION

1. Field of the Invention

The present invention is related to a rolling bearing having high sealing performance and also to a throttle valve apparatus and an anti-lock brake system (hereinafter referred to as the "ABS") which include the rolling bearing.

2. Description of the Related Art

For example, in a throttle valve apparatus of an internal combustion engine, a structure where both ends of a throttle shaft rotatably driving a butterfly valve which opens/closes an air intake passage are supported by rolling bearings is well known. The rolling bearing for such structure requires good sealing performance (air tightness) for preventing intake-air leakage. Further, the rolling bearing is configured to receive the intake negative pressure of an engine and also to receive supercharging pressure in the case of an engine with a supercharger. Since these pressures fluctuate greatly depending on the operating condition of the engine, the rolling bearing needs to maintain sufficient air-tightness against these large pressure fluctuations.

In contrast, Japanese Patent Application Laid-Open (JP-A) No. 2004-263734 (hereinafter referred to as Reference 1) discloses a seal structure in which the annular space between the inner ring and the outer ring is sealed by a pair of annular seal members provided on both ends of the rolling bearing (especially refer to FIG. 6 of Reference 1). In the above seal structure, however, if a pressure higher than the atmospheric pressure is applied to one of the pair of seal members from the outside, a lip part of the seal member may be rolled up to the side of the annular space. As a result, the internal pressure of the annular space may increase, and the other seal member may be rolled up to the outside and may separate from the rolling bearing.

Further, Reference 1 also discloses a rolling bearing which is configured in that, even when a pressure higher than the atmospheric pressure is applied from the outside to one of the seal members and the lip part thereof is moved toward the annular space side, the movement of the lip part may be limited by a step portion provided on an outer peripheral surface of the inner ring (especially refer to FIG. 1 of Reference 1). In the above rolling bearing, however, since the step portion, i.e. the portion contacted by the lip part, is usually finished by cutting process, it results in an inferior surface accuracy compared to the surface accuracy finished by grinding process. Therefore, it is difficult to obtain a high sealing performance at the step portion.

In addition, grinding the step portion may increase the manufacturing cost because a low cost centerless grinding process cannot be performed to the step portion.

SUMMARY OF THE INVENTION

The present invention has been made in view of the above circumstances, and the object of the present invention is to provide a simply structured, inexpensive rolling bearing, in which the sealing performance against positive and negative pressures is improved and sufficient air tightness against pressure fluctuations is maintained. The object of the present invention is also to provide a throttle valve apparatus and an ABS which include such a rolling bearing.

In order to solve the above-described problems, the present invention provides a rolling bearing including: an inner ring; an outer ring; a plurality of rolling elements disposed in an annular space formed between the inner ring and the outer ring; and an annular seal member composed of a metal core and an elastic body covering the metal core, the annular seal member being adapted to seal the annular space.

The seal member includes a lip part which is made of the elastic body, the lip part being provided at the inner peripheral part of the bearing and contacting to the outer peripheral surface of the inner ring. The lip part is branched on the inner peripheral side of the bearing, whereby the lip part includes an outside lip part slantly extending toward the outside of the annular space so as to contact the outer peripheral surface of the inner ring and an inside lip part slantly extending toward the inside of the annular space so as to contact the outer peripheral surface of the inner ring, The lip part and the outer peripheral surface of the inner ring provide a gap therebetween, the gap being formed by a contact part between the outside lip part and the outer peripheral surface of the inner ring and a contact part between the inside lip part and the outer peripheral surface of the inner ring.

The metal core extends to a vicinity of the branched part formed by the outside lip part and the inside lip part of the lip part.

A throttle valve apparatus according to the present invention is a throttle valve apparatus of an internal combustion engine, in which a throttle shaft to which a throttle valve which opens/closes an air intake passage is attached is rotatably supported by the above-described rolling bearing of the present invention.

An anti-lock brake system according to the present invention is an anti-lock brake system of a vehicle, in which a drive shaft of an electric motor for driving an ABS pump is rotatably supported by the above-described rolling bearing of the present invention.

According to the present invention, the sealing performance of the rolling bearing against positive and negative pressures is improved and sufficient air tightness against pressure fluctuations can be maintained. The structure of the rolling bearing according to the present invention is well simplified, and the cost thereof can be thus reduced.

BRIEF DESCRIPTION OF THE DRAWINGS

FIG. 2 is an enlarged view of a seal member which is an essential part of the rolling bearing shown in FIG. 1;

DETAILED DESCRIPTION OF THE PREFERRED EMBODIMENTS

Embodiments of the present invention will be explained in detail hereinbelow based on the drawings.

Figure 1:
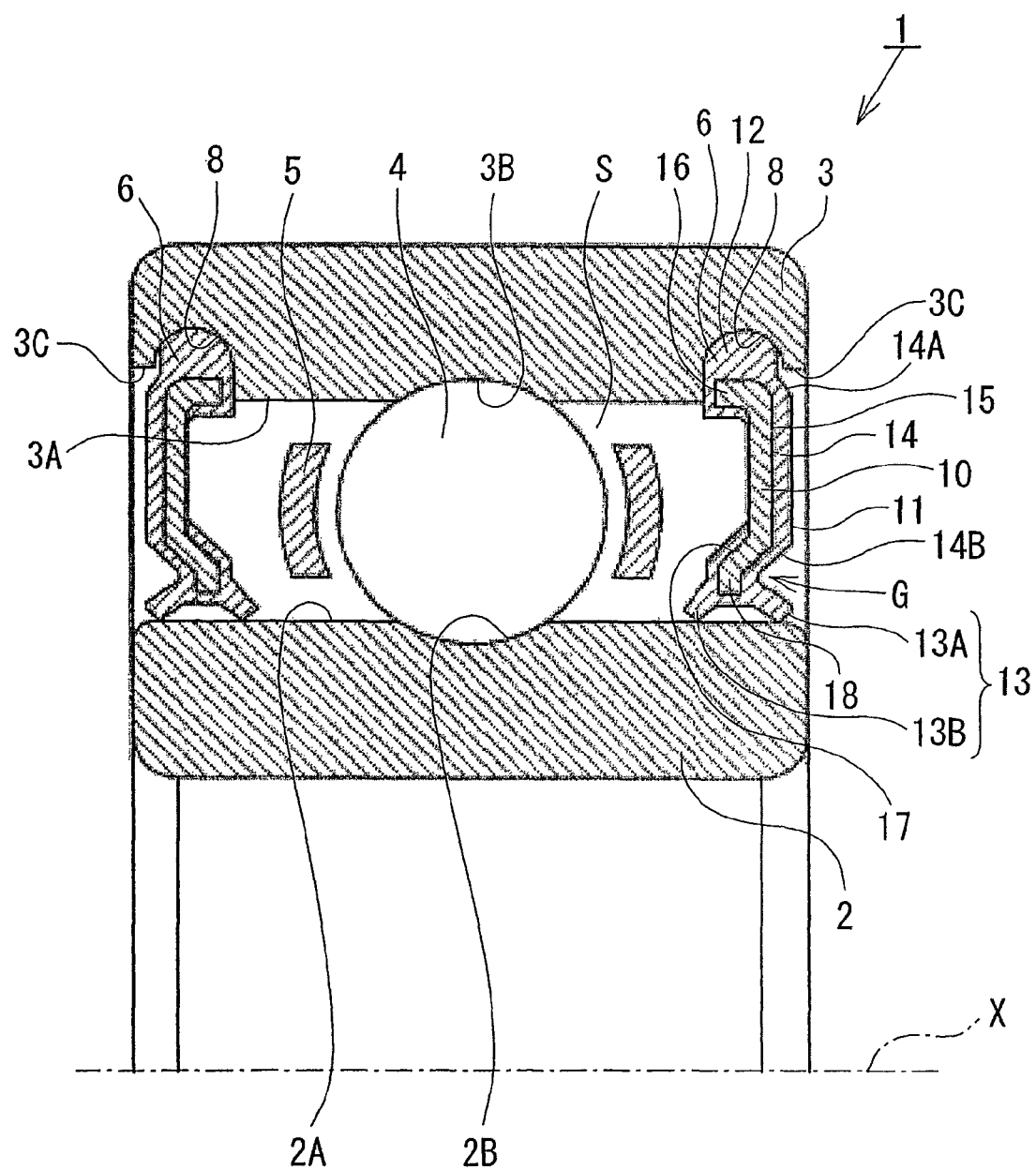
FIG. 1 is a cross-section view of a rolling bearing according to the first embodiment of the present invention.

The first embodiment of the present invention will be explained with reference to FIGS. 1 and 2. FIG. 1 is a cross-section view in a plane containing an axial direction X, which is the rotation axis of a bearing 1 according to the first embodiment. FIG. 2 is an enlarged view indicating a seal member 6 of FIG. 1.

As shown in FIG. 1, the bearing 1 is a rolling bearing having a sealing function, and includes an inner ring 2, an outer ring 3, a plurality of rolling elements 4 (steel balls) disposed between a raceway surface 2B formed on an outer peripheral surface 2A of the inner ring 2 and a raceway surface 3B formed on an inner peripheral surface 3A of the outer ring 3, and a retainer 5 that retains the rolling elements 4 at predetermined intervals on the raceway surfaces 2B and 3B. In the bearing 1, seal members 6 and 6 are provided on both ends in the axial direction X of an annular space S between the inner ring 2 and the outer ring 3. The seal members 6 and 6 thus seal the annular space S between the inner ring 2 and the outer ring 3. The two seal members 6 and 6 have the same structure, and thus only one of them will be explained in detail (the seal member 6 on the right side in FIG. 1).

The outer peripheral surface 2A of the inner ring 2 is a cylindrical surface having a constant diameter, excluding the raceway surface 2B which is placed at a central part in the axial direction X. Both end portions of the inner peripheral surface 3A of the outer ring 3 in the axial direction X have annular seal grooves 8 and 8 to which the seal members 6 and 6 are attached. The seal grooves 8 and 8 are formed along the circumferential direction and have the same shape. The cross-section shape of the bottom parts of the seal grooves 8 is approximately semicircle. Inner peripheral portions 3C and 3C at both ends of the outer ring 3, i.e. the portions outside the seal grooves 8 and 8 in the axial direction X, are made larger in diameter than the inside portions.

The seal member 6 is composed of a metal core 10 and a rubber-like elastic body 11 covering the metal core 10. The seal member 6 is an annular member which is integrally formed by the following parts: a fitting part 12 on the outer peripheral side that fits into the seal groove 8 of the outer ring 3; a lip part 13 on the inner peripheral side that contacts the outer peripheral surface 2A of the inner ring 2; and an intermediate part 14 between the fitting part 12 and the lip part 13. The fitting part 12 has approximately the same shape with the inner surface of the seal groove 8, the fitting part 12 being fitted into the seal groove 8 so as to fix the seal member 6 to the outer ring 3. The intermediate part 14 is offset toward the outside from the center of the fitting part 12 and the lip part 13 in the axial direction X, and is connected to the fitting part 12 and the lip part 13 via inclined parts 14A and 14B. An inner peripheral side of the lip part 13 is branched to form an outside lip part 13A and an inside lip part 13B that slantly extend toward the outside and the inside of the annular space S, respectively. The end parts of the outside lip part 13A and the inside lip part 13B contact the outer peripheral surface 2A of the inner ring 2. A V-shaped groove G is formed between the inclined part 14B and the inclined outside lip part 13A. If the elastic body 11 is used under high temperatures such as those in the exhaust gas of an engine, it is preferably made of fluororubber or the like which has high heat resistance being able to suppress any deteriorations caused by heat.

The metal core 10 is integrally formed by the following parts: a flat part 15 that is arranged along the intermediate part 14 of the seal member 6 and is parallel to a plane which is orthogonal to the axial direction X; an outside flange part 16 that is positioned at the outer peripheral side of the flat part 15 and is bent at an approximately right angle toward the inside in the axial direction X; an inclined part 17 that is positioned at the inner peripheral side of the flat part 15 and is bent toward the inside in the axial direction X along the inclined part 14B; and an extension part 18 that is bent parallel to the flat part 15 at the inner peripheral side of the inclined part 17 and extends to the vicinity of the ramification part where the lip part 13 divides into the outside lip part 13A and the inside lip part 13B. The metal core 10 is insert-molded in the elastic body 11 and thus covered by the elastic body 11. However, a portion of inside part of the flat part 15 in the axial direction X is not covered by the elastic body 11 and is exposed to the outside. The metal core 10 reinforces the elastic body 11 and helps to maintain the shape of the seal member 6 when subjected to external forces.

The shape of the lip part 13 of the seal member 6 is explained in further detail referring to FIG. 2.

The end portion of the extension part 18 of the metal core 10 extends beyond the deepest part of the V-shaped groove G toward the inside in the radial direction by a dimension D, i.e., the inner diameter of the extension part 18 is smaller than the diameter of the deepest part of the V-shaped groove G by the dimension D. In the lip part 13, since the outside and inside lip parts 13A and 13B are slantly formed, a lower surface defined between the end parts of the outside and inside lip parts 13A and 13B that contact the outer peripheral surface 2A of the inner ring 2 forms a gap H with the outer peripheral surface 2A of the inner ring 2. The width W1 of the gap H in the axial direction X is equal to or greater than the width W of the base of the outside and inside lip parts 13A and 13B (i.e. the thickness of the seal member 6 at the deepest part of the V-shaped groove G). The radial dimension (clearance) of the gap H is smaller than the thickness T of the outside and inside lip parts 13A and 13B (the dimension line of the thickness T is shown only for the outside lip part 13A). The inner diameter of the outside and inside lip parts 13A and 13B is smaller than the outer diameter of the outer peripheral surface 2A of the inner ring 2 by a predetermined dimension, and the outside and inside lip parts 13A and 13B are elastically pressed against the outer peripheral surface 2A of the inner ring 2 when the seal member 6 is inserted into the seal groove 8.

Without the gap H in the radial direction described above, the outside and inside lip parts 13A and 13B cannot easily deform, and this may cause an increase in the rotational torque of the inner ring 2. In case the gap H is larger than the thickness T of the outside and inside lip parts 13A and 13B, the outside and inside lip parts 13A and 13B may go into the gap H when deformed and thus they may be easily curled. On the other hand, when the dimension of the gap H in the axial direction X is insufficient, the outside and inside lip parts 13A and 13B cannot easily deform. Excessive pressing force may be thus generated and the rotational torque of the inner ring 2 may increase. The dimension W1 (i.e. the width in the axial direction X) of the gap H is preferably equal to or larger than the width W of the base of the outside and inside lip parts 13A and 13B.

The outer peripheral surface 2A of the inner ring 2 with which the outside and inside lip parts 13A and 13B make contact is finished by centerless grinding process, and preferably the surface roughness is set such that an arithmetic average roughness Ra is equal to or less than 0.25 μm (Ra≤0.25 μm) and a total height of a primary profile Pt is equal to or less than 3.0 μm (Pt≤3.0 μm) (JIS B 0601:2001). With respect to the respective contact surface of the outside and inside lip parts 13A and 13B which contacts the outer peripheral surface 2A of the inner ring 2, a maximum height of a roughness profile Rz is equal to or less than 6.0 μm (Rz≤6.0 μm) and an arithmetic average roughness Ra is equal to or less than 1.3 μm (Ra≤1.3 μm).

A lubricating agent such as grease is retained in an appropriate amount within the annular space S surrounded by the inner ring 2, the outer ring 3, and the seal members 6 and 6 so as to lubricate the inner ring 2, the outer ring 3, the rolling elements 4, and the retainer 5.

The action of the bearing 1 having the structure described above is explained below.

Referring to FIG. 2, when a positive pressure acts on the seal member 6 side of the bearing 1 (refer to the arrow with hatching in FIG. 2), the outside lip part 13A which is slantly projecting toward the outside is pressed to the outer peripheral surface 2A of the inner ring 2 by the pressure acting onto an inclined outer peripheral surface 13A1, and closely adheres to the outer peripheral surface 2A of the inner ring 2. The air tightness can be thus maintained. Since the force pressing the outside lip part 13A to the outer peripheral surface 2A of the inner ring 2 is proportional to the pressure of a pressurized fluid, the air tightness can be maintained even under a high pressure.

Further, when a force tending to incline the seal member 6 toward the inside is applied to the seal member 6 due to the action of positive pressure, the outside lip part 13A is pressed to the outer peripheral surface 2A of the inner ring 2. Accordingly, the sealing capability at the inner ring 2 is maintained.

On the other hand, when a negative pressure acts on the seal member 6 (refer to the blank arrow in FIG. 2), the inside lip part 13B which is slantly projecting toward the inside is pressed to the outer peripheral surface 2A of the inner ring 2 by the pressure (differential pressure between the inside and the outside of the seal member 6) acting on an inclined outer peripheral surface 13B1, and closely adheres to the outer peripheral surface 2A of the inner ring 2. The air tightness can be thus maintained. Here, the force pressing the inside lip part 13B to the outer peripheral surface 2A of the inner ring 2 is proportional to the differential pressure between the inside and the outside of the seal member 6. The air tightness can be thus maintained even under a high negative pressure.

Further, when a force is applied to the seal member 6 to incline the seal member 6 toward the outside due to the action of negative pressure, the inside lip part 13B is pressed to the outer peripheral surface 2A of the inner ring 2. Accordingly, the sealing capability at the inner ring 2 is maintained.

The seal member 6 is reinforced by the metal core 10, thereby increasing its rigidity and maintaining a predetermined shape. Further, the extension part 18 of the metal core 10 extends to the vicinity of the ramification part of the outside lip part 13A and the inside lip part 13B. Therefore, regardless of whether a positive or negative pressure acts on the seal member 6, the air tightness can be reliably maintained without the outside lip part 13A and the inside lip part 13B being bent and rolled up or the seal member 6 separating from the seal groove 8.

In this way, the seal member 6 can maintain air tightness against a high pressure (differential pressure) regardless of whether a positive or negative pressure acts on the seal member 6. Further, the seal member 6 can prevent the ingress of foreign particles into the bearing 1 and can also prevent leaks of the lubricating agent in the bearing 1. As a result, the bearing 1 can be used as a bearing which requires air tightness such as a throttle valve of an engine or a pump motor of an ABS of a vehicle. Also, a separate seal means is made unnecessary, and thus the number of parts and the man-hours for assembly can be reduced.

In the seal member 6, it is preferable that the inclination angles of the outside lip part 13A and the inside lip part 13B are approximately symmetrical so that their rigidity is almost the same with a force pushing the seal member 6 toward the inside and a force pushing the seal member 6 toward the outside, both of which are generated by pressures (positive and negative pressures) acting on the seal member 6. However, in the case of operational conditions in which the positive pressure is significantly larger than the negative pressure, for example, the inclination angle of the outside lip part 13A can be made smaller than the inclination angle of the inside lip part 13B. With this structure where the inclination angles are different from each other, it is possible to increase the force generated by the positive pressure acting on the outer peripheral surface 13A1 by which the outside lip part 13A is pressed against the outer peripheral surface 2A of the inner ring 2. Further, by providing the extension part 18 to the metal core 10 and sufficiently increasing the rigidity of the outside and inside lip parts 13A and 13B as described above, it is not necessary to provide a step that serves as a stopper on the outer peripheral surface 2A of the inner ring 2 to suppress deformation of the lip part. Therefore, the outer peripheral surface 2A of the inner ring 2 excluding the raceway surface 2B can be made into a straight cylindrical surface, thereby allowing the outer peripheral surface 2A of the inner ring 2 contacting the outside and inside lip parts 13A and 13B to be finished by centerless grinding process. By this means, the arithmetic average roughness Ra≤0.25 μm and the total height of a primary profile Pt 3.0 pm of the outer peripheral surface of the inner ring 2 can be easily achieved, and thus high air tightness can be realized and the rotational torque of the inner ring 2 can be kept low. Further, the finishing of the inner ring 2 is also simplified, and thus the manufacturing costs of the bearing 1 can be reduced.

Figure 3:
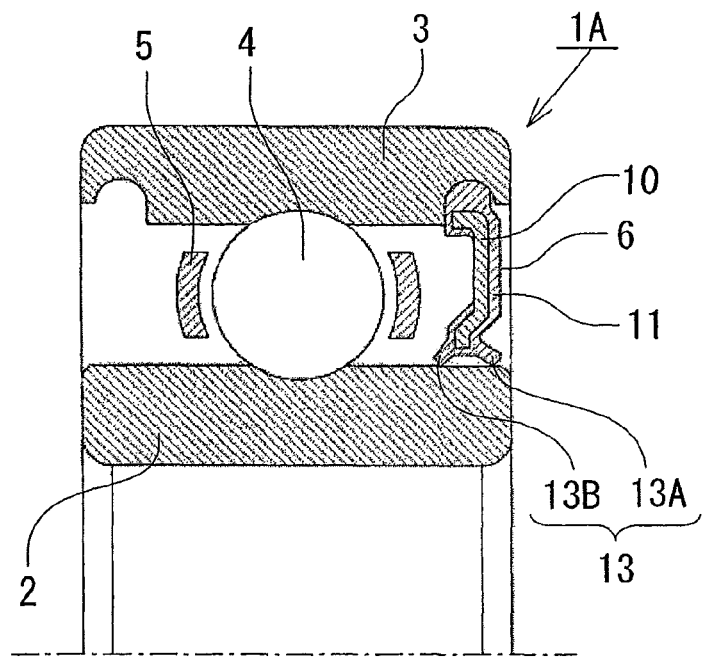
FIG. 3 is a cross-section view of a rolling bearing according to the second embodiment of the present invention.
Figure 4:
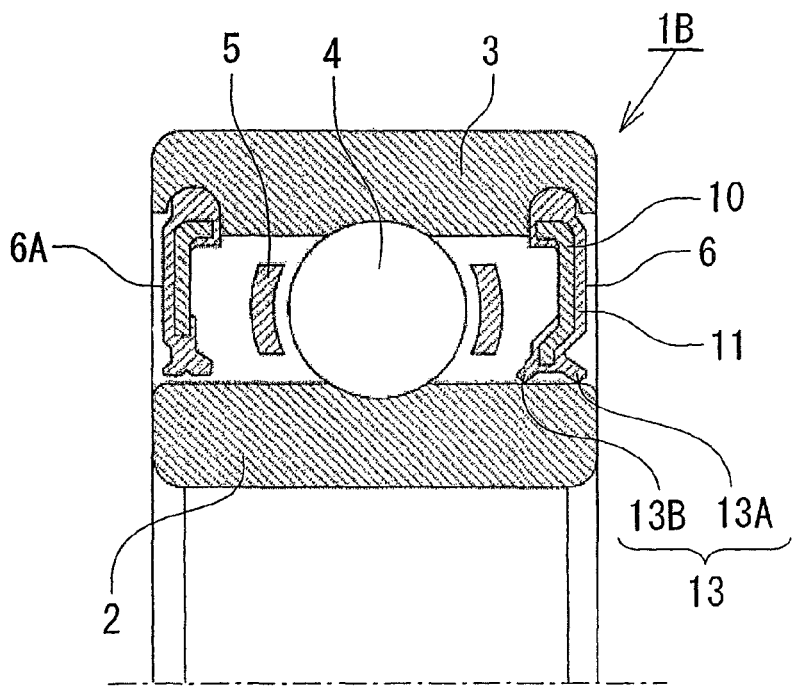
FIG. 4 is a cross-section view of a rolling bearing according to the third embodiment of the present invention.

Next, the second and the third embodiments of the present invention are explained referring to FIGS. 3 and 4. In the following explanations, the same reference numbers are assigned to the same parts as those in the bearing 1 according to the first embodiment, and only the differences are explained in detail.

By providing two lip parts, the outside and inside lip parts 13A and 13B, to the seal member 6 as described above, high air tightness can be maintained by the seal member 6 on one end side against both positive and negative pressures. In a bearing 1A according to the second embodiment as shown in FIG. 3, the seal member 6 on the other end side is thereby omitted. Further, in a bearing 1B according to the third embodiment as shown in FIG. 4, a seal member 6A (a non-contact seal member) which does not contact the inner ring 2 leaving a gap toward the inner ring 2 is provided instead of the seal member 6 on the other end side. The seal member 6A consists of a metal core and an elastic body covering the metal core.

Next, referring to FIGS. 5 to 10, comparison testing for evaluating the air tightness and the starting torque of the bearings 1, 1A, and 1B according to the first, second, and third embodiments described above is explained. As comparisons for the bearings 1, 1A, and 1B, comparative bearings 31, 41, 51, and 61 shown in FIGS. 5 to 8, which differ from the bearings 1, 1A, and 1B only in their seal structures, were prepared, and comparison testing was conducted using a testing apparatus 60 shown in FIG. 9.

Figure 5:
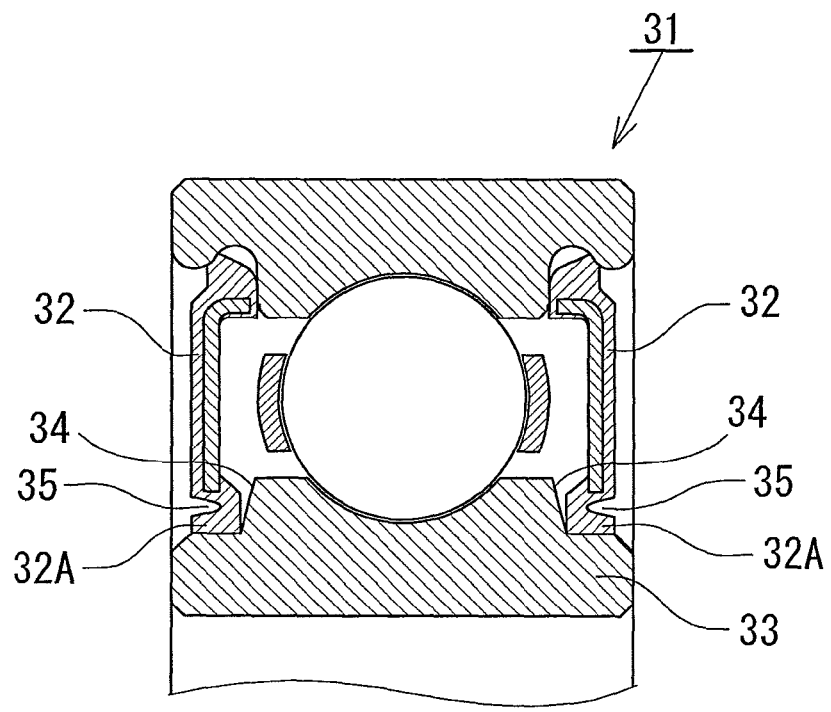
FIG. 5 is a cross-section view of the first comparative bearing, which serves as a comparison for evaluating the air tightness of the rolling bearing according to the present invention.

As shown in FIG. 5, the comparative bearing 31 corresponds to the rolling bearing shown in FIG. 1 of Reference 1. Lip seals 32 and 32 are mounted at both ends, and stepped parts 34 supporting lip parts 32A of the lip seals 32 and 32 are formed on an outer peripheral surface of an inner ring 33 with which the lip parts 32A make contact. The lip parts 32A provide flexibility and increase the adherence to the inner ring 33 by providing V-shaped grooves 35.

Figure 6:
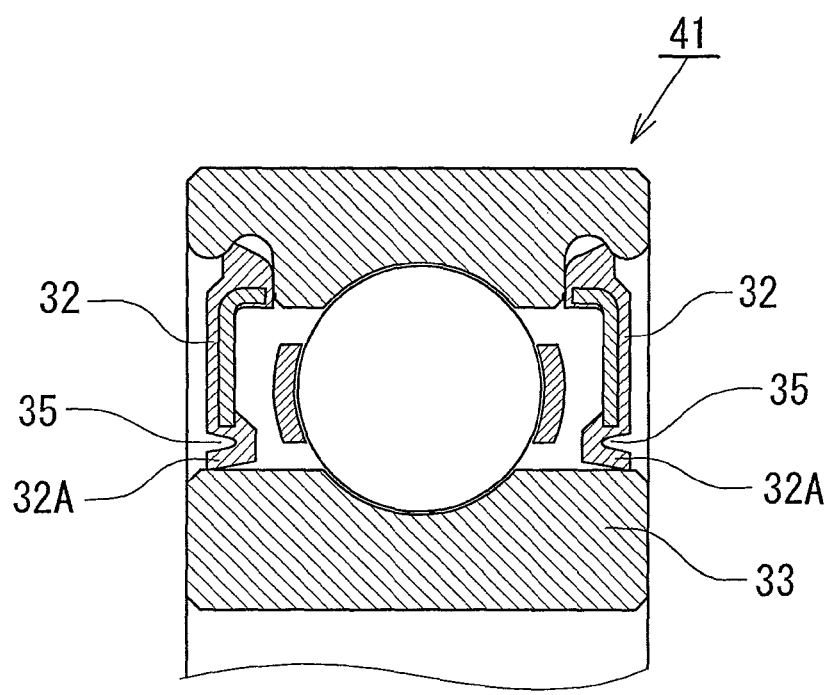
FIG. 6 is a cross-section view of the second comparative bearing, which serves as a comparison for evaluating the air tightness of the rolling bearing according to the present invention.

As shown in FIG. 6, the comparative bearing 41 corresponds to the rolling bearing shown in FIG. 6 of Reference 1. The stepped parts 34 on the outer peripheral surface of the inner ring 33 are omitted compared to the comparative bearing 31 shown in FIG. 5.

Figure 7:
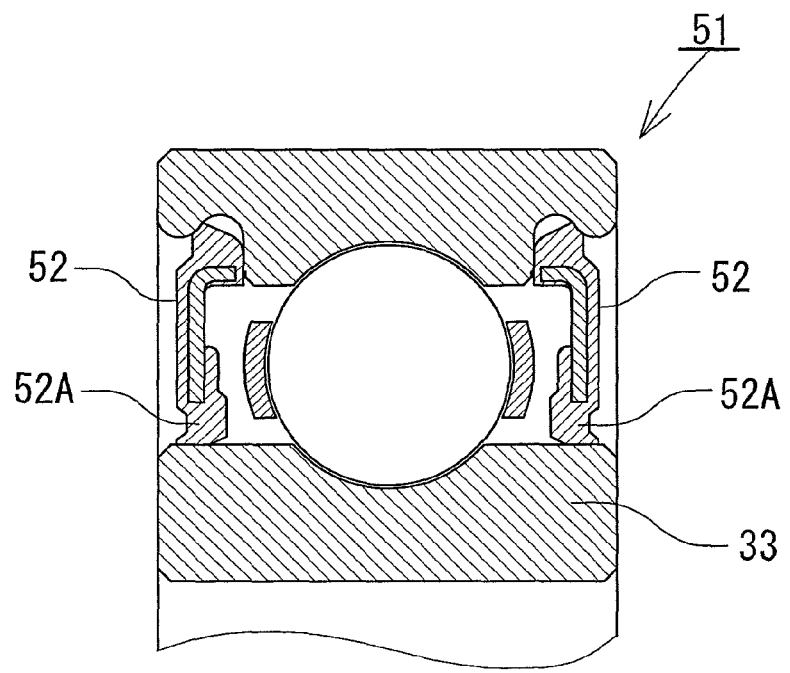
FIG. 7 is a cross-section view of the third comparative bearing, which serves as a comparison for evaluating the air tightness of the rolling bearing according to the present invention.

As shown in FIG. 7, the comparative bearing 51 corresponds to a rolling bearing shown in FIG. 3 of Reference 1. A thickness of a lip seals 52 is increased compared to the comparative bearing 41 shown in FIG. 6, and thus the rigidity of the lip parts 52A is increased.

Figure 8:
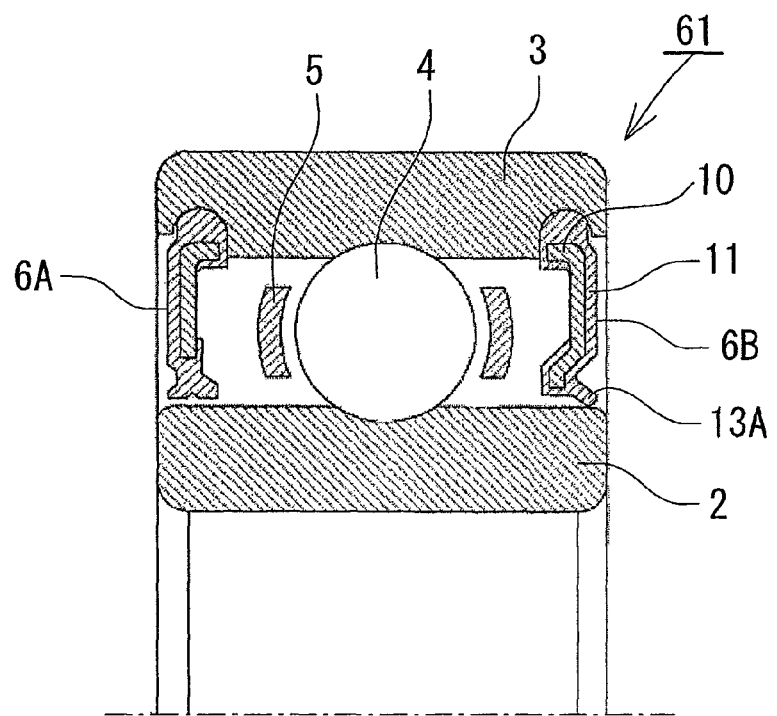
FIG. 8 is a cross-section view of the fourth comparative bearing, which serves as a comparison for evaluating the air tightness of the rolling bearing according to the present invention.

As shown in FIG. 8, in the comparative bearing 61, the inside lip part 13B of one of the two lip parts of the seal member 6 is omitted compared to the rolling bearing 1B according to the third embodiment and a lip seal 6B is thereby provided.

In the comparative bearing 31, the stepped parts 34 on the outer peripheral surface of the inner ring are finished by cutting. Thus, the roughness of the contact part with the lip seals is set as follows:
for the lip seals, total height of a primary profile Pt≤14 μm and arithmetic average roughness Ra≤3.5 μm, and
for the outer peripheral surface of inner ring, total height of a primary profile Pt of stepped part is Pt≤5.0 μm and arithmetic average roughness Ra≤0.5 μm.

The comparative bearings 41, 51, and 61 do not have stepped parts on the outer peripheral surface of the inner ring, and thus they can be finished by grinding process similar to the first to third embodiments. Thus, the roughness of the contact part between the lip seals and the outer peripheral surface of the inner ring is set as follows:
for the lip seals, total height of a primary profile Pt≤14 μm and arithmetic average roughness Ra≤3.5 μm, and
for the outer peripheral surface of inner ring, total height of a primary profile Pt≤3.0 μm and arithmetic average roughness Ra≤0.25 μm (the same roughness as in the first to third embodiments).

Figure 9:
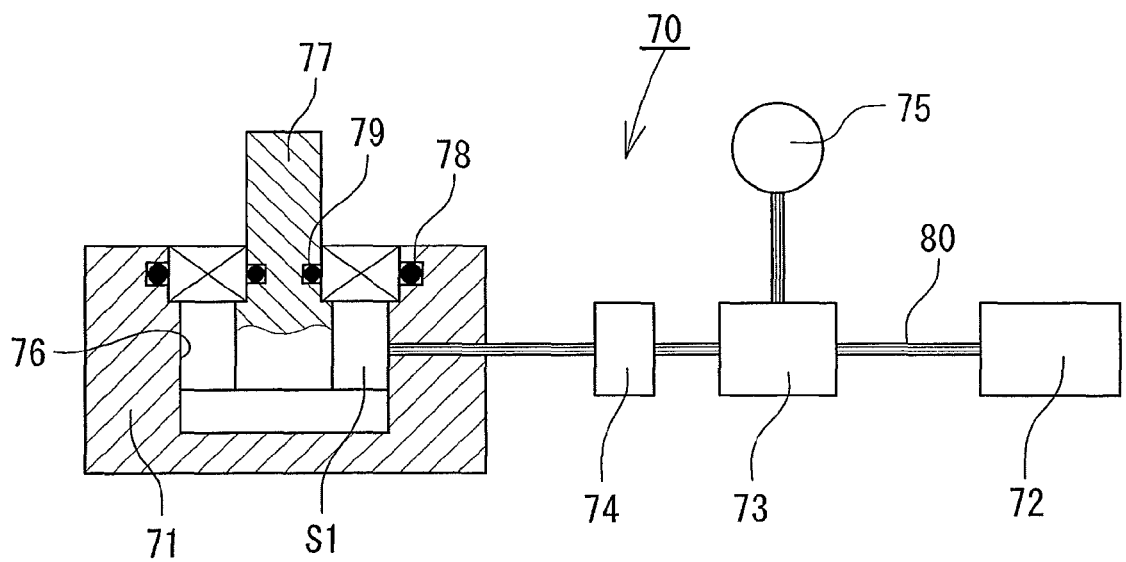
FIG. 9 is a schematic view of a testing apparatus for evaluating the air tightness of the rolling bearing according to the present invention.

As shown in FIG. 9, a testing apparatus 70 includes a jig 71 where a bearing to be tested is set, a pump 72 to supply air (a positive or negative pressure) to the jig 71, a regulator 73 to regulate the positive or negative pressure supplied to the jig 71, a flowmeter 74 to measure the flow rate of air between the jig 71 and the pump 72, and a pressure gauge 75 to measure the pressure of the air supplied to the jig 71. The bearing set in the jig 71 is shown in simplified manner in FIG. 9.

The jig 71 has a structure in which a small-diameter shaft part 77 is erected at the center of a bore 76 having circular cross-section to form a cylindrical space within the bore 76, and O-rings 78 and 79 are respectively mounted in an inner peripheral groove of the bore 76 and an outer peripheral groove of the shaft part 77. The bearing is set in the cylindrical space between the bore 76 and the shaft part 77 by inserting the bearing to the shaft part 77. The O-ring 78 seals the area between the outer ring of the bearing and the bore 76 and the O-ring 79 seals the area between the inner ring of the bearing and the shaft part 77, and thereby a sealed cylindrical bearing chamber Si is formed in the bore 76.

In the case of applying a positive pressure to the bearing, the pump 72 is configured as a pressure pump, compressed air is supplied to the bearing chamber S1 of the jig 71 through a pipe 80, and the pressure of the compressed air supplied to the bearing chamber 51 is regulated to a predetermined pressure by the regulator 73 and the pressure gauge 75. The flow rate of the compressed air flowing from the pump 72 side to the jig 71 side is measured with the flowmeter 74.

In the case of applying a negative pressure to the bearing, the pump 72 is configured as a vacuum pump, a negative pressure is supplied to the bearing chamber S1 of the jig 71 through the pipe 80 (i.e., air is suctioned from the bearing chamber S1), and the negative pressure supplied to the bearing chamber S1 is regulated to a predetermined pressure by the regulator 73 and the pressure gauge 75. The flow rate of the air flowing from the jig 71 side to the pump 72 side is measured with the flowmeter 74.

The flow rate of air flowing through the pipe 80 was measured with the flowmeter 74 when different bearings were set in the jig 71 and negative pressure and positive pressure were supplied according to the following Conditions 1 to 3. Hereinafter the pressure difference in the evaluation test means the difference of pressure in relation to the atmospheric pressure. Evaluation results of the air tightness considering the measured value of the flow rate as the amount of leakage of each bearing are shown in Table 1.

Condition 1: applying a pressure difference of from −60 kPa to +129 kPa to the bearing chamber S1.
Condition 2: applying a pressure difference of from +130 kPa to +235 kPa to the bearing chamber S1.
Condition 3: applying a pressure difference of from −70 kPa to +500 kPa to the bearing chamber S1.

The required air tightness performance is 0.5 ml/min. or less, and the required starting torque is 0.015 Nm or less.

The evaluation results are indicated by O, X, and A based on the following criteria:
O: both the required air tightness performance and starting torque are satisfied,
Δ: the required air tightness performance is satisfied, but the required starting torque is not satisfied, and
X: the required air tightness performance is not satisfied.

TABLE 1

| Sample | Condition 1 Pressure Difference −60 kPa to +129 kPa | Condition 2 Pressure Difference +130 kPa to +235 kPa | Condition 3 Pressure Difference −70 kPa to +500 kPa |
|---|---|---|---|
| First Embodiment | O | O | O |
| Comparative Bearing 31 | X | X | X |

TABLE 1-continued

| Sample | Condition 1 Pressure Difference −60 kPa to +129 kPa | Condition 2 Pressure Difference +130 kPa to +235 kPa | Condition 3 Pressure Difference −70 kPa to +500 kPa |
|---|---|---|---|
| Comparative Bearing 41 | X | X Inversion of Seal | X Inversion of Seal |
| Comparative Bearing 51 | Δ High Starting Torque | Δ High Starting Torque | X |

In Condition 1, as shown in Table 1, the air tightness performance of 0.5 ml/min. or less was satisfied in the bearing 1 of the first embodiment and the comparative bearing 51. However, the comparative bearing 51 was evaluated as Δ because the starting torque was high. The comparative bearing 31 could not satisfy the air tightness performance of 0.5 ml/min. or less because the surface roughness of the surface at which the lip seals were adhered was high. The comparative bearing 41 could not satisfy the air tightness performance of 0.5 ml/min. or less because the surface roughness of the contact part of the lip seals was high.

In Condition 2, the comparative bearings 31 and 41 could not satisfy the air tightness performance of 0.5 ml/min. or less. It was found that when the outer peripheral surface of the inner ring is finished by cutting, it is difficult to reduce the roughness of the portion at which the lip seals and the inner ring make contact, and thus the air tightness cannot be secured. Further, it is necessary to suppress the surface roughness of the contact part of the lip seals as well.

Figure 10:
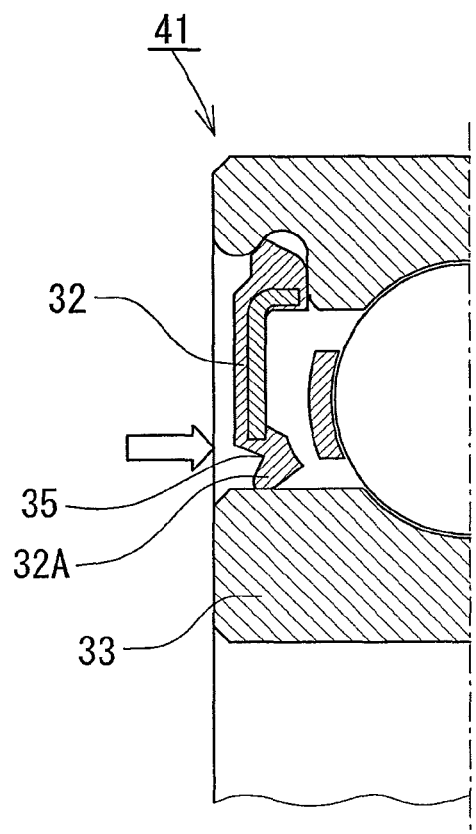
FIG. 10 is an explanatory view showing a state in which a seal member is deformed and rolled up by the positive pressure in the second comparative bearing shown in FIG. 6.

In a case where an air tightness performance of 0.5 ml/min. or less is required under Condition 2 or 3, if V-shaped groove 35 is formed in the lip seal 32 to provide lip part 32A and the inner diameter of the metal core is set to be larger than the diameter of the V-shaped grooves as in the comparative bearing 41, the rigidity of the lip part 32A of the lip seal 32 becomes insufficient. Therefore, when the outer peripheral surface of the inner ring 33 has a straight shape (cylindrical surface), the lip part 32A is inverted or rolled up toward the low pressure side (bearing inner side) as shown in FIG. 10, and the air tightness cannot be maintained. In the comparative bearing 31, on the other hand, the lip part 32A is not inverted because the stepped part 34 is provided on the outer peripheral surface of the inner ring to support the lip part 32A.

However, since the stepped part 34 is usually made by milling process, the surface roughness becomes high and thus it is difficult to obtain sufficient air tightness.

In the comparative bearing 51, the inner diameter portion of lip seal 52 was not inverted and thus the air tightness requirement could be satisfied by increasing the thickness of the inner diameter portion of the lip seal 52 to impart rigidity as shown in FIG. 7. However, the frictional resistance of the contact part between the lip seal 52 and the inner ring 33 became high, and thus the starting torque was increased.

Next, the flow rate of the air flowing through the pipe 80 was measured with the flowmeter 74 when the bearings 1A and 1B of the second and third embodiments and the comparative bearing 61 with a seal member 6 on only one side, were individually set in the jig 71 and negative and positive pressures were supplied under the following Conditions 4 to 7. Evaluation results of the air tightness considering the measured value of the flow rate as the amount of leakage of each bearing are shown in Table 2.

Condition 4: applying a pressure difference of −20 kPa to the bearing chamber S1.
Condition 5: applying a pressure difference of −70 kPa to the bearing chamber S1.
Condition 6: applying a pressure difference of +300 kPa to the bearing chamber S1.
Condition 7: applying a pressure difference of +500 kPa to the bearing chamber S1.

The required air tightness performance is 0.5 ml/min. or less, and the required starting torque is 0.015 Nm or less.

The evaluation results are indicated by O, X, and Δ based on the following criteria:
O: both the required air tightness performance and starting torque are satisfied,
Δ: the required air tightness performance is satisfied, but the required starting torque is not satisfied, and
X: the required air tightness performance is not satisfied.

In Table 2, "Orientation A" indicates that the seal member 6 or 6B was at the atmospheric side, and "Orientation B" indicates that the seal member 6 or 6B was at the bearing chamber S1 side.

TABLE 2

| Sample | Orientation | Condition 4 Pressure Difference −20 kPa | Condition 5 Pressure Difference −70 kPa | Condition 6 Pressure Difference +300 kPa | Condition 7 Pressure Difference +500 kPa |
|---|---|---|---|---|---|
| Second Embodiment | A | O | O | O | O |
|  | B | O | O | O | O |
| Third Embodiment | A | O | O | O | O |
|  | B | O | O | O | O |
| Comparative Bearing 61 | A | O | O | X | X |
|  | B | O | X | O | O |

As shown in Table 2, the comparative bearing 61 satisfied the required starting torque in all conditions, but an air leak of flow rate 0.5 ml/min or more was found in Condition 5 (a pressure difference of −70 kPa), Condition 6 (a pressure difference of +300 kPa), and Condition 7 (a pressure difference of +500 kPa). In contrast, the results show that the bearings 1A and 1B according to the second and third embodiments satisfied the required air tightness and starting torque in all conditions.

Figure 11:
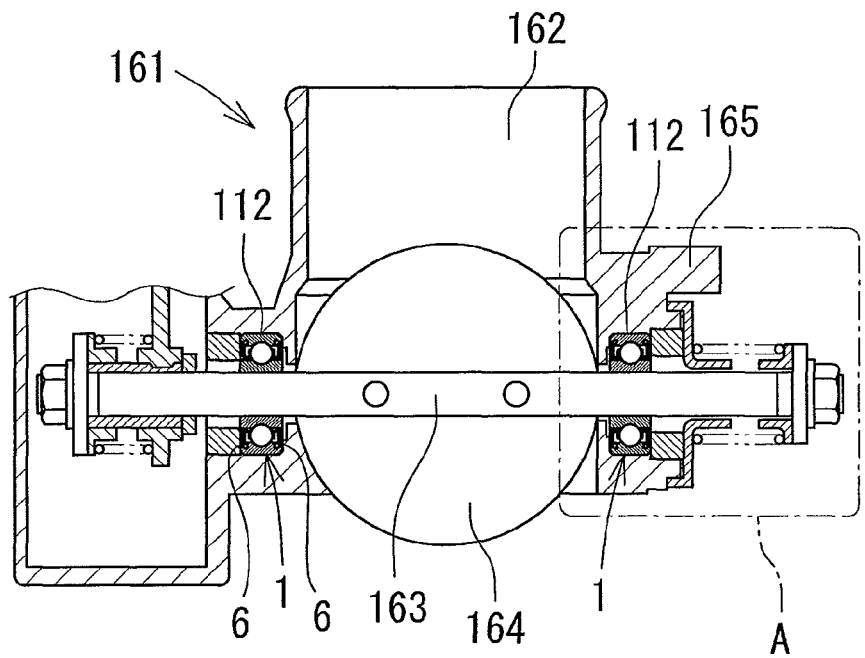
FIG. 11 is a cross-section view of a throttle valve apparatus according to the fourth embodiment of the present invention.

Next, the fourth embodiment of the present invention is explained referring to FIG. 11. In the fourth embodiment, the bearings 1 according to the first embodiment shown in FIG. 1 are incorporated into a throttle valve apparatus 161 of an internal combustion engine.

In the throttle valve apparatus 161, a throttle valve 164 is fixed to a throttle shaft 163 penetrating an air intake passage 162 in the diametrical direction (the left-right direction in FIG. 11), and both ends of the throttle shaft 163 are supported by the bearings 1. The outer rings 3 of the bearings 1 are fitted into fitting grooves 112 of a housing 165. The structure of the throttle valve apparatus 161 excluding the rolling bearings 1 is the same as a conventional throttle valve apparatus, and thus a detailed explanation of the throttle valve apparatus 161 is omitted.

In the throttle valve apparatus 161, the pressure within the air intake passage 162 changes frequently during running of the vehicle (i.e., operation of the internal combustion engine). A positive or negative pressure is thereby applied to the seal member 6 on the air intake passage 162 side among the seal members 6 of each bearing 1, depending on the structure of the engine. Thus, for example, when using the comparative bearing 41 and a positive pressure is applied to the conventional seal members 32, the lip parts 32A are strongly pressed to the outer peripheral surface of the inner ring 33, and as a result, the sliding resistance between the lip parts 32A and the outer peripheral surface of the inner ring 33 is increased, which also leads to an increase in the rotational resistance of the rolling bearing. When a large positive pressure is applied to the seal member 32 on the air intake passage 162 side, an inner peripheral part 15 of the lip part 32A of the seal member 32 is inverted and rolled up toward the inside as shown in FIG. 10, and thus the air tightness performance of the seal structure is lost. When a large negative pressure is applied to the seal member 32 on the opposite side of the air intake passage 162, the inner peripheral part of the lip part 32A of the seal member 32 is inverted and rolled up toward the inside, and thus the air tightness performance of the seal structure is lost.

In the fourth embodiment, since both ends of the throttle shaft 163 are supported by the bearings 1 according to the first embodiment described above, the required air tightness performance (sealing performance) can be secured regardless of whether a positive or negative pressure is applied to the seal members 6 of the bearings 1. Further, a throttle valve apparatus 161 suitable for use in a rather severe environment, in which the pressure difference between the air intake passage 162 and the annular space S of the bearing 1 varies from −70 kPa to +500 kPa, can be provided. Also, since the lip part in the seal member 6 has a double lip structure consisting of the outside lip part 13A and the inside lip part 13B, the air tightness performance can be maintained against both positive and negative pressure. Accordingly, in the fourth embodiment, the air tightness performance can be secured even when, for example, the seal member 6 is attached only on the air intake passage 162 side rather than both sides of the bearing 1. In this case, a non-contact rubber seal can be provided on the opposite side, or the opposite side can be left open without attaching any seal member. Since the seal member 6 is a contact seal, by attaching the seal member 6 on only one side of the bearing 1, the sliding resistance is decreased and the starting torque can be reduced compared to a case in which the seal members 6 are attached on both sides.

If the opposite side of the bearing 1 is left open without attaching any seal, the end surface of the open side is preferably abutted to another member as shown in FIG. 11 so that the ingress of foreign particles into the bearing 1 can be avoided. In the case that a non-contact rubber seal 6A is attached on the opposite side as in the bearing 1B according to the third embodiment shown in FIG. 4, the bearing alone can prevent the ingress of foreign particles without increasing the starting torque. In addition, in either case, the manufacturing cost can be reduced compared to the case of attaching the seal members 6 on both sides of the rolling bearing 1.

Figure 12:
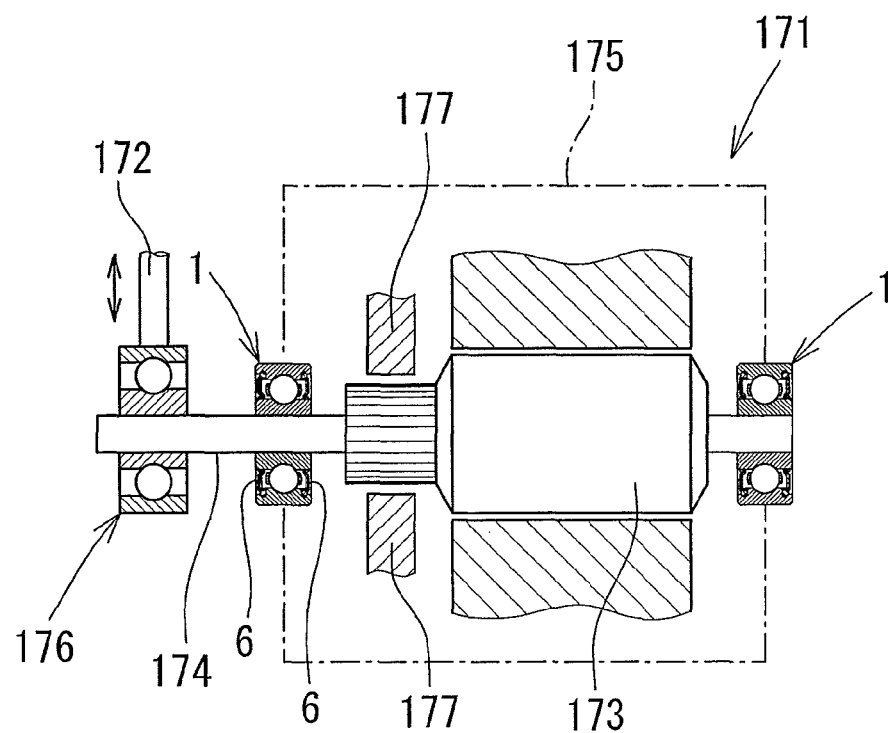
FIG. 12 is a cross-section view of the essential parts of an ABS according to the fifth embodiment of the present invention.

Next, the fifth embodiment of the present invention is explained referring to FIG. 12. In the fifth embodiment, the bearings 1 according to the first embodiment shown in FIG. 1 are incorporated into an ABS 171 of a vehicle.

The ABS 171 includes a piston 172 for pumping brake fluid within a reservoir tank and supplying it to a master cylinder of a brake apparatus, and an electric motor 173 for driving an ABS pump that drives the piston 172. A drive shaft 174 of the electric motor 173 is supported by a pair of the bearings 1 that are attached to a motor housing 175.

As shown in FIG. 12, the electric motor 173 is accommodated within the sealed motor housing 175. However, the drive shaft 174 extends to the piston 172, side (the left side in FIG. 12), and an eccentric rolling bearing 176 for moving the piston 172 back and forth in the vertical direction in FIG. 12 is assembled to the end of the drive shaft 174. Therefore, if a leakage of brake fluid occurs on the piston 172 side, the seal structure on the piston 172 side of the rolling bearing 1 placed on the piston 172 side is exposed to the leaked brake fluid.

At this time, if the fluid tightness performance (sealing performance) of the seal structure on the piston 172 side of the rolling bearing 1 placed on the piston 172 side is insufficient, the leaked brake fluid may penetrate into the motor housing 175 from the rolling bearing 1 placed on the piston 172 side. If the brake fluid that has penetrated into the motor housing 175 reaches a brush 177 of the electric motor 173, the electric motor 173 may malfunction.

In the fifth embodiment, since the drive shaft 174 of the electric motor 173 is supported by the bearings 1 of the first embodiment, even if a leakage of brake fluid occurs on the piston 172 side, the leaked brake fluid can be reliably prevented from penetrating into the motor housing 175 from the bearing 1 placed on the piston 172 side due to the double lip structure of the seal members 6 of the bearing 1. Malfunctions of the electric motor 173, and by extension malfunctions of the ABS can be thereby proactively prevented, and a highly reliable ABS can be provided. The above-described objectives can be also be achieved by providing the bearing 1 only on the piston 172 side of the drive shaft 174 (the left side in FIG. 12). Further, the seal member 6 can also be provided only on the piston 172 side.

In the above-described embodiments, ball bearings are explained as one example. However, the present invention is not limited thereto, and, for example, other rolling bearings such as a roller bearing can also be applied in the same manner.

What is claimed is:
1. A rolling bearing comprising:
an inner ring,
an outer ring,
a plurality of rolling elements disposed in an annular space formed between the inner ring and the outer ring,
an annular seal member configured to seal the annular space, the seal member including:
a metal core including an extension part extending radially within the seal member beyond a deepest portion of a V-shaped groove of the seal member, the extension part being defined as a portion extending beyond the deepest portion of the V-shaped groove,
an elastic body covering the metal core, and a lip part provided at an inner peripheral part of the seal member, the lip part being a part of the elastic body, the lip part being configured to contact an outer peripheral surface of the inner ring, the lip part being branched at the inner peripheral side of the seal member, and the lip part including: (i) an outside lip part slantly extending toward an outside of the annular space so as to contact the outer peripheral surface of the inner ring, and (ii) an inside lip part slantly extending toward an inside of the annular space so as to contact the outer peripheral surface of the inner ring, and a gap formed by the outer peripheral surface of the inner ring and a lower surface of the lip part, the gap being located between a first contact part where the outside lip part contacts the outer peripheral surface of the inner ring and a second contact part where the inside lip part contacts the outer peripheral surface of the inner ring, the gap including: (i) an intermediate portion having a constant radial dimension, and (ii) end portions having radial dimensions that decrease as the radial dimensions move away from the intermediate portion towards either the first contact part or the second contact part, the gap being configured to have a radial dimension equal to or less than a thickness of the outside lip part and a thickness of the inside lip part.

2. The rolling bearing according to claim 1, wherein a width of the gap between the first contact part and the second contact part and in an axial direction of the rolling bearing is equal to or greater than a width in the axial direction of a base of the outside and inside lip parts.

3. The rolling bearing according to claim 1, wherein the outer peripheral surface of the inner ring has a cylindrical surface with a constant diameter that extends from a raceway surface, in which the plural rolling elements roll, to an end of the inner ring.

4. The rolling bearing according to claim 1, wherein
a contact surface of the outside lip part and a contact surface of the inside lip part which contact the inner ring have a surface roughness in which the maximum height of roughness profile is equal to or less than 6.0 µm and the arithmetic average roughness is equal to or less than 1.3 µm, and
a contact surface of the inner ring which contacts the outside and inside lip parts has a surface roughness in which the total height of a primary profile is equal to or less than 3.0 µm and the arithmetic average roughness of roughness profile is equal to or less than 0.25 µm.

5. The rolling bearing according to claim 1, wherein the seal member is provided on only one end side of the annular space.

6. The rolling bearing according to claim 5, wherein a seal means is not provided on another end side of the annular space.

7. The rolling bearing according to claim 5, wherein an annular non-contact seal member, which does not contact the inner ring, is provided on the another end side of the annular space, the annular non-contact seal member including a metal core and an elastic body covering the metal core.

8. A throttle valve apparatus of an internal combustion engine, wherein a throttle shaft to which a throttle valve that opens and closes an air intake passage is attached is rotatably supported by the rolling bearing according to claim 1.

9. An anti-lock brake system of a vehicle, wherein a drive shaft of an electric motor for driving an anti-lock brake system pump is rotatably supported by the rolling bearing according to claim 1.

* * * * *